Nov. 26, 1968   F. CALABRESE   3,412,876
APPARATUS FOR THE LOADING AND UNLOADING OF
PALLETIZED CARGO ON FLOATING VESSELS
Filed March 9, 1966   4 Sheets-Sheet 1
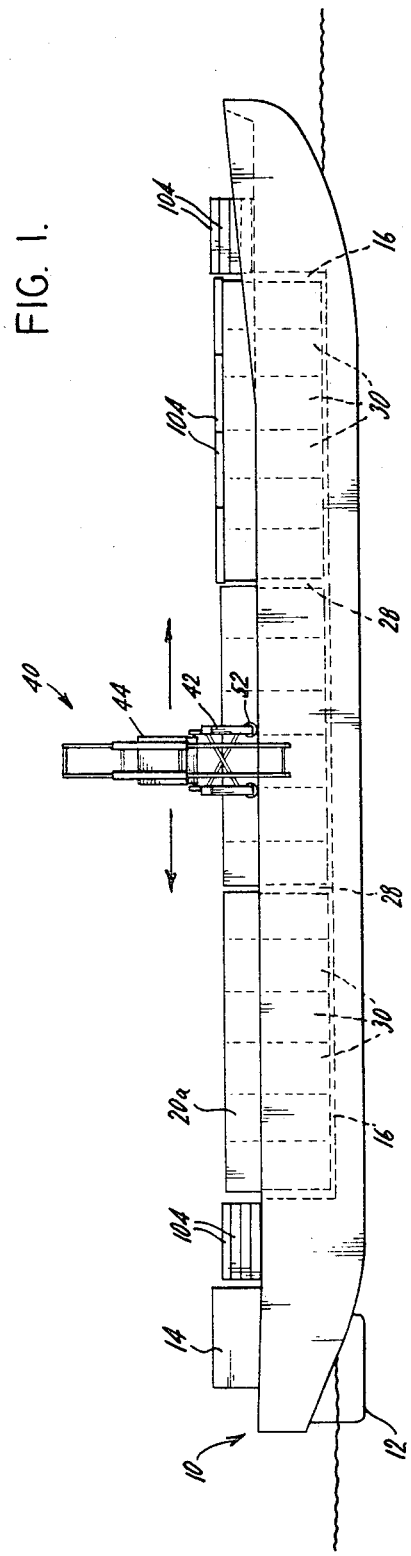
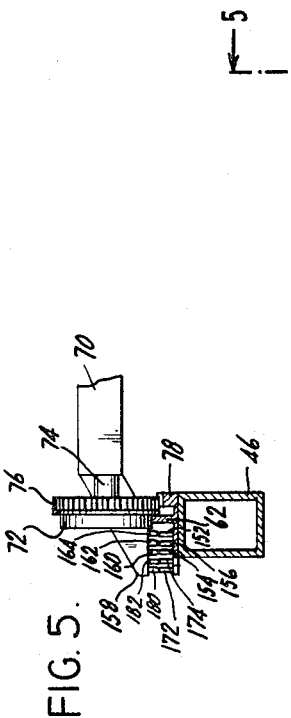
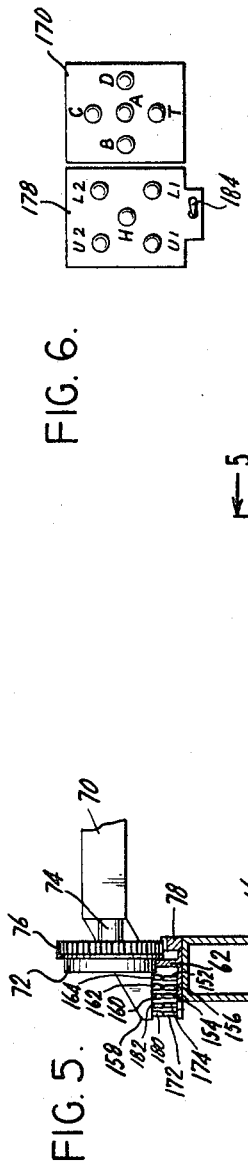
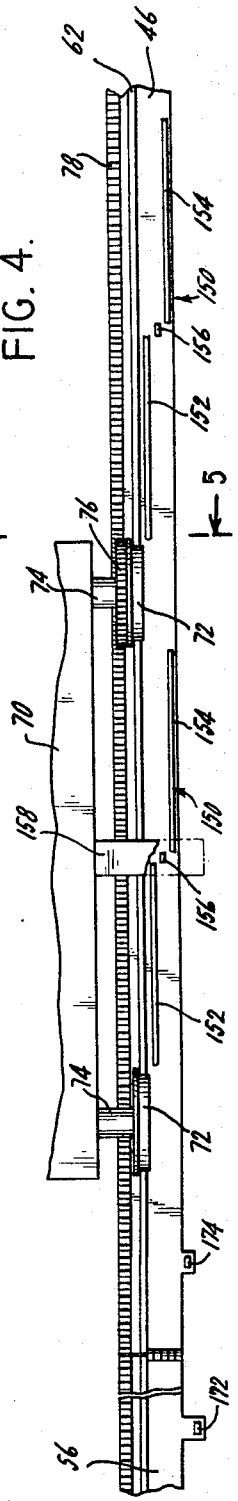

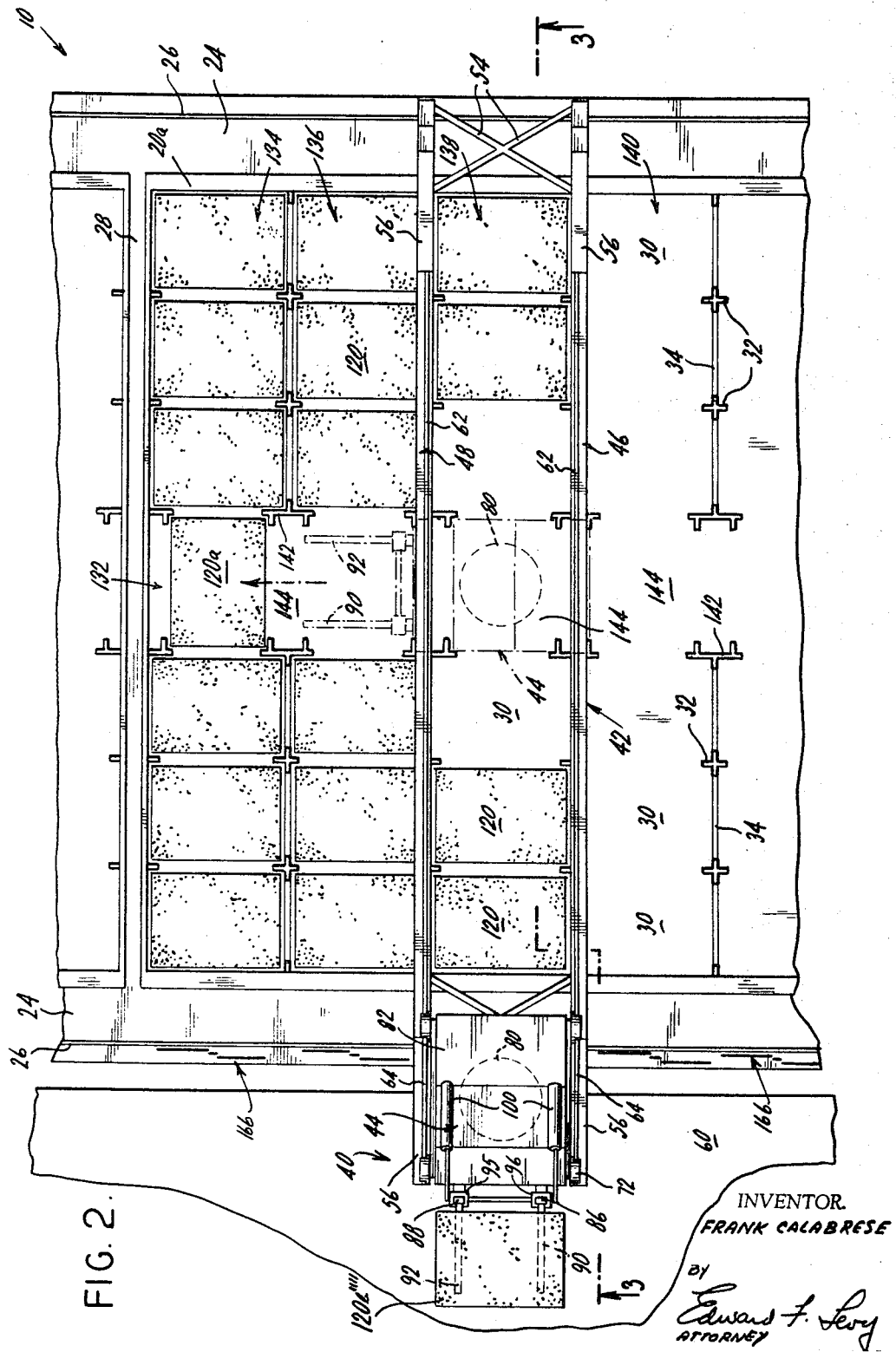

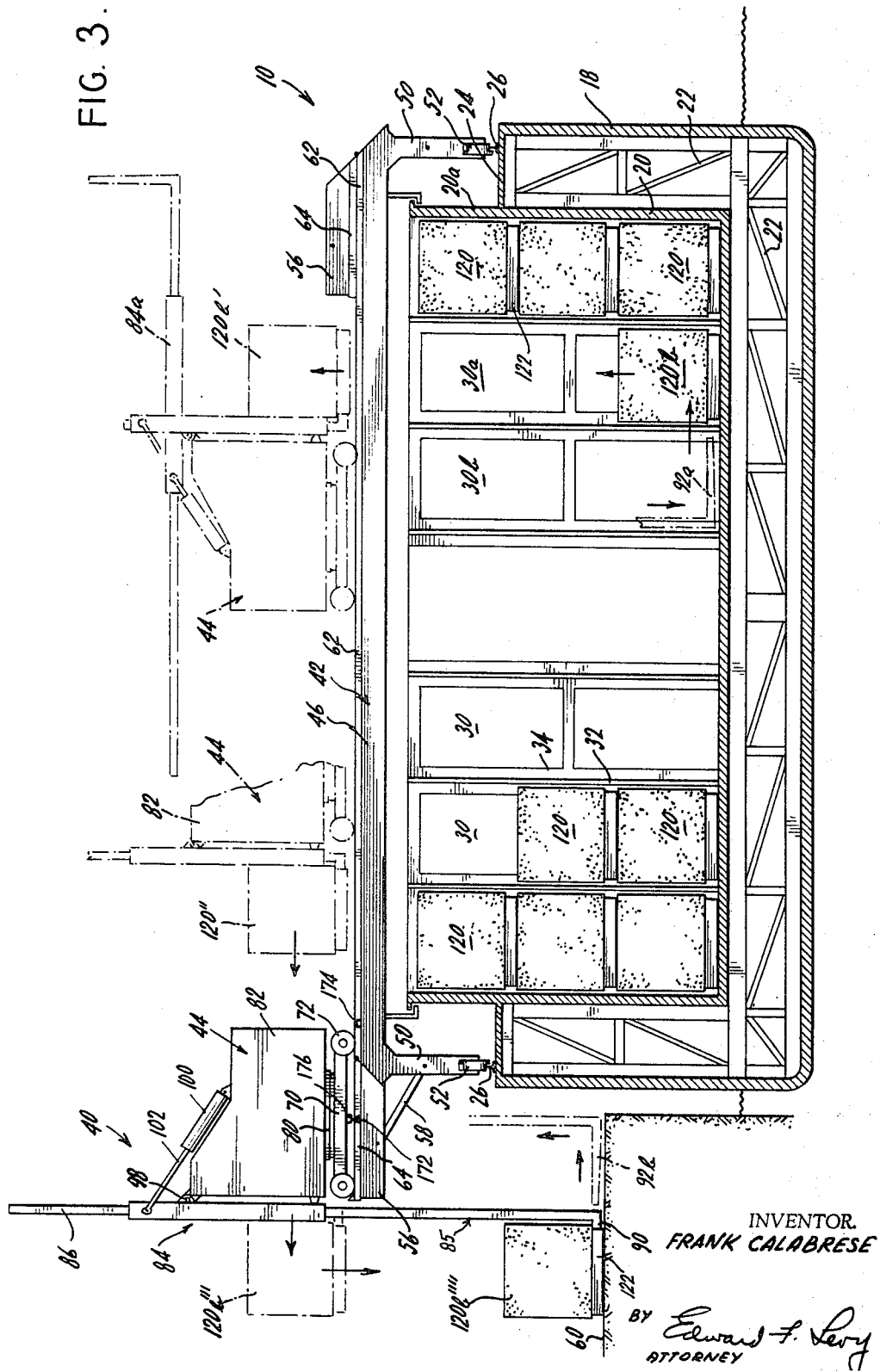

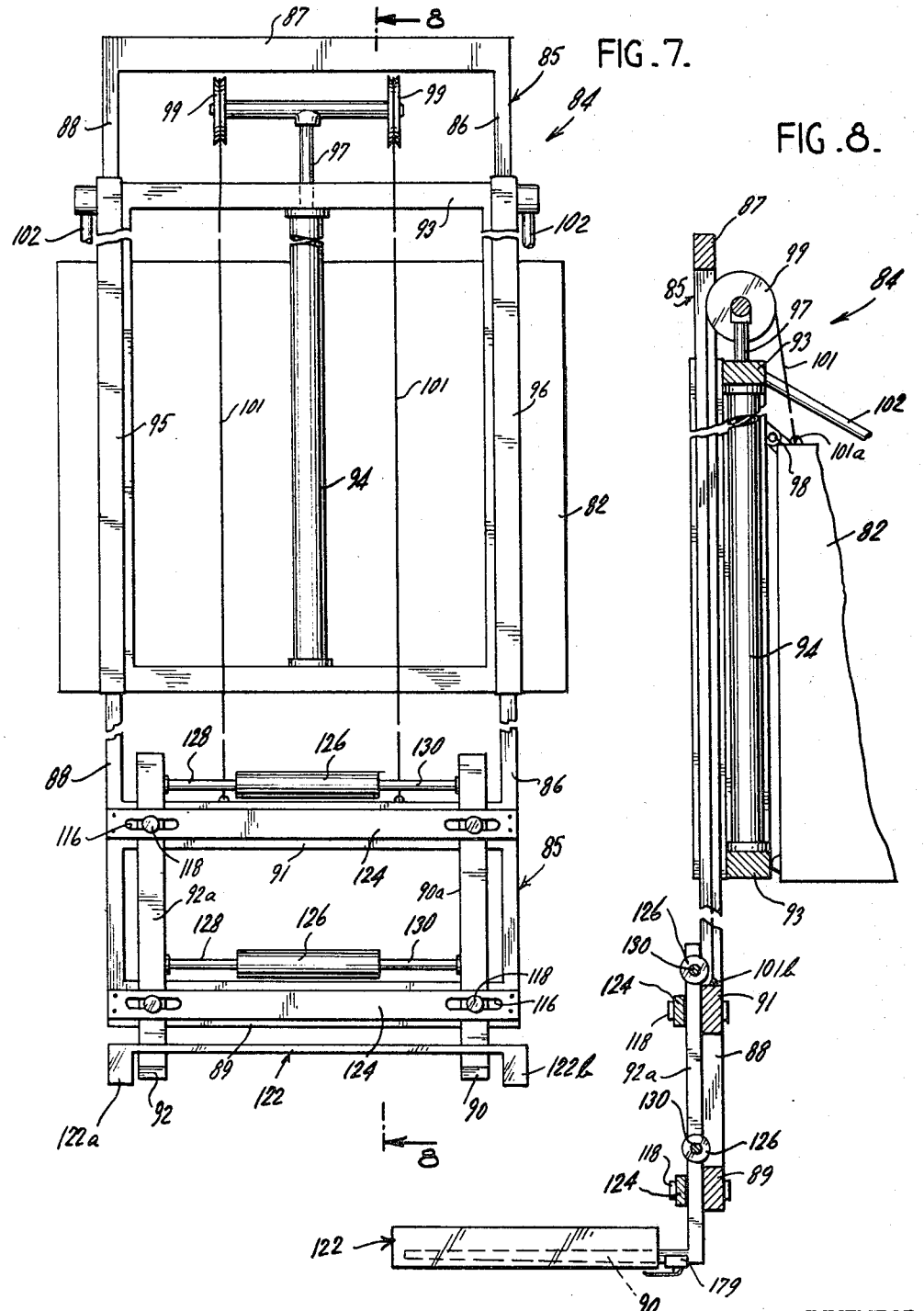

United States Patent Office 3,412,876
Patented Nov. 26, 1968

3,412,876
APPARATUS FOR THE LOADING AND UNLOAD-
ING OF PALLETIZED CARGO ON FLOATING
VESSELS
Frank Calabrese, 4828 194th St.,
Flushing, N.Y. 11365
Filed Mar. 9, 1966, Ser. No. 533,009
11 Claims. (Cl. 214—15)

ABSTRACT OF THE DISCLOSURE

Apparatus for transferring cargo mounted on pallets between the hold of a floating vessel and a pier or the like at which the vessel is docked. A gantry is mounted for movement longitudinally of the vessel and a fork lift truck is movable transversely along the gantry. The fork lift truck has an elongated frame carrying fork blades at the lower end thereof, which frame is of sufficient length to be lowered to the bottom of the cargo hold of the vessel and to the surface of said pier for transferring cargo carried by said fork blades between the hold and the pier. Electrical signal means are provided to inform an operator located in and operating the fork lift truck of the horizontal and vertical locations of the fork blades.

---

The present invention relates to materials handling systems and in particular to the handling of pallet-supported loads. The invention has application to a system and apparatus for the loading and unloadingg of barges and ships utilizing pallets.

The loading of cargo into ships and barges has always presented innumerable problems with regard to positioning of the cargo, utilizing the maximum available space, balancing the load, shoring the cargo and moving the cargo into and out of the available hold space. Such problems make the loading of cargo an extremely difficult and complicated procedure, involving considerable time and expensive manual operations.

As an answer to the constantly increasing cost of cargo loading and handling, it has been proposed to pack the cargo in containers which would facilitate handling, stowing for storage, and eliminate some damage to the cargo. The use of such containers has not proved practical, however, because of the expense involved in building and packing the containers, and because of the necessity for adopting standard size containers which are not suitable for many types of cargo. In addition problems of faulty ventilation, pilferage and faulty stowage have been encountered.

It is the purpose of the present invention to eliminate many of the problems of conventional cargo handling and loading procedures by packing cargo on pallets, providing novel equipment for loading and unloading the pallets in ships and barges and for loading the pallets on docks, and providing novel and improved hold structure for ships and barges which eliminates the need for shoring and at the same time facilitates the loading and unloading operations.

The use of palletized loads is commonly employed in industry for materials handling operations, construction and the like, and has proved efficient and effective. For lifting the loaded pallets, conventional fork lift trucks are utilized, the truck forks being conventionally adapted to move between ground level and elevated positions. Palletized loads have not hitherto been used or ever considered for ship cargo loading because of the necessity of lowering the loads into the ship holds below deck level which cannot be accomplished with available fork equipment. A primary feature of the present invention, therefore, is the provision of pallet-handling apparatus capable of engaging a loaded pallet on a dock or other loading surface, raising the load above deck level, transporting the load to a selected position on the ship or barge and lowering and depositing the load in the ship hold. By the provision of such equipment, a novel and advantageous method of loading cargo by means of pallets is made possible.

An object of the invention is the provision of cargo loading apparatus of the character described which is readily adaptable for installation on barges and for application to ships, and capable of being stored in compact condition when not in use, eliminating the need for costly and cumbersome hold machinery. The equipment is also provided with automatic signalling means enabling a single operator to handle the entire loading and unloading operation with precise accuracy.

Another object of the present invention is the provision of interior hold construction for a vessel which is particularly adapted for use in conjunction with the aforesaid loading equipment to provide compartments capable of receiving the palletized loads snugly, and eliminating the necessity for shoring loads. These compartments are so arranged as to receive a maximum amount of stacked loads, and thus effectively utilize up to 99% of the cargo space available, while minimizing possible damage to the ship hull and to the cargo. The compartments are also arranged for ideal ventilation and refrigeration, and tend to reduce pilferage.

The cargo loading equipment in conjunction with the compartmentalized construction of the hold makes possible the provision of a unique loading and unloading process and system which greatly decreases the manual handling and number of men required for conventional operations of this type, and also decreases by a considerable extent the time required for such operations, rendering unnecessary the long lay-overs at ports now required for this purpose. The loading process of the invention is also adapted for ready and easy provision of the ship with the optimum trim by selectively balancing the load at various parts of the ship during the loading operation, even when partial cargo is stowed, as between ports of call.

Additional objects and advantages of the invention will become apparent during the course of the following specification when taken in connection with the accompanying drawings, in which:

FIG. 1 is a side elevational view of a barge constructed in accordance with the invention and having the novel loading apparatus mounted thereon;

FIG. 2 is a top plan view of a portion of the barge of FIG. 1, showing the interior construction thereof and the manner in which palletized cargo is loaded therein;

FIG. 3 is a section along line 3—3 of FIG. 2, with various operational positions of the loading apparatus being shown in phantom;

FIG. 4 is an enlarged top plan view of a portion of the gantry guide rail for the fork truck;

FIG. 5 is a section on enlarged scale taken along line 5—5 of FIG. 4;

FIG. 6 is a plan view of the control panel for the loading apparatus;

FIG. 7 is a front elevational view of the fork lift assembly mounted on the fork truck, with portions thereof broken away for convenience of illustration; and FIG. 8 is a section taken along line 8—8 of FIG. 7.

Referring in detail to the drawings and particularly to FIGS. 1, 2, and 3, there is shown therein a barge 10 particularly constructed in accordance with the invention to receive palletized loads, although it is to be understood that the apparatus and loading process of the invention can be applied to any ship or vessel having a top-opening cargo hold.

The barge 10 has the usual skag or rudder 12 and a deck house 14 located at the stern thereof so that the entire intermediate portion of the barge presents an uninterrupted hold area 16. As shown in detail in FIG. 3, the barge 10 may be made with an outer hull 18 connected to an inner hull 20 by suitable framework 22, for increased buoyancy. The inner hull 20 is higher than the outer hull 18, the upper portion thereof forming a hatch wall 20a about the top of the hold area 16. The hatch wall 20a may be divided and enclosed into multiple hatches by cross walls 28, as shown in FIGS. 1 and 3.

As further shown in FIG. 3 the upper end of the outer hull 18 is joined to the inner hull 20 by a deck 24 which extends along each side of the barge 10. A rail 26 is mounted on the deck 24 on each side of the barge, and extends along the length thereof.

The interior of each hold area is divided into a series of compartments or bays 30 by a framework structure comprising a plurality of angle irons 32 interconnected by metallic open framed plates or stiffeners 34, as best seen in FIGS. 2 and 3. This framework is arranged in such a manner as to receive and snugly contain the palletized loads, as will be later explained in detail.

The cargo loading and unloading apparatus mounted on the barge 10 is generally indicated by the reference numeral 40 and comprises a gantry 42 carrying a fork truck 44. The gantry 42 has a superstructure including a pair of spaced longitudinal rails 46 and 48 mounted upon legs 50 having flanged wheels 52 which roll upon the rails 26 carried by deck 24. The rails 46 and 48 are connected by cross braces 54 and at each end, the rails have extensions 56 which are hingedly mounted on the respective rails and supported in extended position by struts 58. In FIGS. 2 and 3, the left-hand extensions 56 are shown in extended position, while the right-hand extensions 56 are shown in retracted position, folded upon the rails 46 and 48. In the extended position, the extensions 56 project beyond the outer hull 18 of the barge and overlie the dock 60 adjacent one side of the barge. The rails 46 and 48 carry respective tracks 62, and each of the extensions 56 carry similar track sections 64 serving as continuations of said tracks 62.

The fork truck 44 comprises a chassis 70 mounted on flanged wheels 72. As shown in FIGS. 4 and 5, the rear set of wheels 72 are mounted on a common axle 74 with pinions 76 which mesh with racks 78. The pinions 76 provide the drive for the truck 44. Similar pinions (not shown) are provided in association with the wheels of the gantry 42.

As shown in FIGS. 2 and 3, the truck chassis 70 supports a turntable 80 which in turn supports the truck cab 82. The cab 82 includes the usual operator's compartment as well as drive means (not shown) for rotating the cab 82 relative to the wheeled chassis 70 through the turntable 80. Mounted on the cab 82 is a fork lift assembly 84 comprising a rectangular frame 85 having a pair of spaced, parallel elongated side arms 86 and 88 which support respective fork blades 90 and 92.

The frame 85 is driven through suitable drive means in the truck cab 82 to raise and lower the fork blades, as is usual in conventional fork trucks. The arrangement shown herein, however, differs from the standard fork truck in that the fork arms 86 and 88 are adapted to be lowered well below the level of the wheeled chassis 70. That is to say, while in conventional fork trucks, the fork blades are adapted to be lowered only to the ground level upon which the truck wheels are resting, in the truck construction of the invention, the fork blades 90 and 92 are adapted to be brought downwardly well below the wheel support level, so as to enter the hold area located beneath the truck.

The side arms 86 and 88 of frame 85 are connected at their top and bottom ends by respective cross arms 87 and 89, and intermediate their ends by a cross arm 91. The frame 85 is mounted on a frame-like support member 93 by a pair of elongated U-shaped guide brackets 95 and 96 secured to the support member 93 and slidably receiving the frame side arms 86 and 88.

Mounted at the center of support member 93 is a hydraulic cylinder 94 from which projects a slidable piston rod 97 mounting a pair of spaced pulley sheaves 99. Cables 101 are trained over the respective sheaves 99, one end of each cable 101 being anchored at 101a to the truck cab 82, as shown in FIG. 8, and the other end of each cable 101 being secured at 101b to the cross arm 91 of frame 85. The cylinder 94 is connected to a conventional hydraulic system regulated by suitable controls (not shown) in the truck cab 82, so as to operate in the well known manner to raise and lower the fork frame 85 by hydraulic force. The pulley arrangement, provided by sheaves 99 and cables 101, produces a relatively long movement of frame 85 in response to movement of the piston rod 97.

Through additional controls in the cab, the operator may also drive the fork truck 44 selectively in a forward and rearward direction (port and starboard) upon the gantry 42, and may also drive the gantry forwardly and rearwardly (fore and aft) upon the barge deck 24. Cab controls are also provided so that the operator may vary the spacing between the fork blades 90 and 92, in a manner to be presently described.

As shown in FIGS. 3 and 8, the support member 93 is pivotally mounted at 98 to the fork truck cab 82 and is pivotally connected to the body of cab 82 by hydraulic actuating means in the nature of a pair of piston and cylinder arrangements 100. The piston rods 102 are connected to the support member 93 at a point above the pivotal mount 98, as shown in FIG. 3, in such a manner that the fork lift assembly 84 may be turned about pivot 98. In operative condition, the fork lift assembly is positioned as shown in FIG. 3 with the support member 93 extending vertically along the front of the truck cab 82, and therefore supporting the fork frame side arms 86, 88 in a vertical position. Controls for the hydraulic actuating means 100 are provided within the truck cab 82 whereby the operator may cause the piston rods 102 to draw within the cylinders 100 and turn the fork lift assembly 84 to the retracted position shown in phantom at 84a in FIG. 3. In this retracted position, the support member 93, cylinder 94, and fork frame 85 are disposed horizontally above the truck cab 82. In this condition, the loading equipment may be brought to a stowed condition when the barge is ready to sail; the fork lift assembly 84 being brought to a retracted position on the truck 44, and the gantry 42 being brought aft and stowed for trim.

The barge is provided with a plurality of removable hatch covers 104 which are used to cover over the open tops of the hatches, and which may be removed and stored in stacked condition, as shown in FIG. 1, during the loading and unloading operations.

For use of the loading apparatus, individual loads 120 are each mounted upon a pallet 122, with both load and pallet sized to fit snugly within one of the cells or bays 30 defined by the angle irons 32 connecting stiffener plates 34. It will be observed in FIG. 2 that the stiffener plates 34 extend only transversely of the barge and not longitudinally, so that the bays 30 are arranged in a series of transverse rows or open aisles which permit the lift truck blades to deposit and withdraw the loads in selected cells.

Stated generally, in a loading operation, the aforementioned lift truck apparatus is employed in situations where the level of the barge deck and the hold area of the barge are not aligned with the level of the pier or dock from which the palletized goods are to be removed or upon which the goods are to be deposited. Where the barge is to be loaded, the goods 120 are received upon pallets 122 and are stacked at the edge of the pier or dock 60 close to the adjacent side of the barge 10 as shown in FIGS. 2 and 3. The corresponding gantry extension 56 is brought to its horizontal position overlying the edge of the dock, and the gantry is moved to a position in which it and the mounted fork truck are opposite a selected load. The fork truck is then driven on the gantry toward the load, and to a position in which the fork blades 90, 92 are clear of the side of the barge, but are located rearwardly of the load. The operator then actuates the hydraulic cylinder 94 in such a manner as to lower the fork frame 85 until the fork blades are spaced a very slight distance above the surface of the dock. The fork truck is then driven forwardly until the fork blades extend beneath the pallet 122.

The loading apparatus is now in position to lift the palletized load, and after adjustment of the fork blades relative to the pallet as will be presently described, the fork frame is elevated to lift the pallet and load thereon to the level of the fork truck and above the wheels thereof. The fork truck is then driven to a position in which its blades are centered over the cell or bay 30 to receive the load, the truck cab 82 being rotated and the gantry 42 also being driven, if necessary. The loading apparatus is operated to lower the load until its pallet is deposited in the selected cell, the fork truck is moved away from the cell in a direction to withdraw the fork blades from beneath the deposited pallet, and the blades are again raised to the level of the cab. The truck may then be driven back toward the end of the gantry to pick up another load and repeat the process. For unloading the palletized cargo from the barge to the dock, a reverse procedure is followed, as will be presently explained in detail.

As previously indicated, one of the important features of the invention resides in the means which are provided for insuring that the palletized load is properly centered on the fork blades before the load is lifted. Since the fork truck operator is controlling the loading or unloading operation from a remote truck cab, when a load is to be lifted from the dock or from within the barge, there is a good possibility that the fork truck blades will not be inserted beneath the pallet supporting the load with such accuracy that the blades are centered beneath the load. Consequently, when the blades are raised to lift the load, the pallet will tend to tip on the blades and drop off or spill the load. In addition, where a load is to be deposited in a cell, mis-alignment of the load on the fork blades will cause the load to strike the walls of the cell. To prevent such occurrences, the blades 90 and 92 are slidably mounted relative to the fork frame side arms 86, 88 for transverse movement toward and away from each other.

It will be seen in FIGS. 7 and 8 that the fork blades 90 and 92 have respective upright legs 90a and 92a which are slidably mounted between the cross arms 89 and 91 of the fork frame 85 and a pair of cross bars 124 secured to the respective cross arms 89 and 91 in alignment therewith and spaced therefrom. Each cross bar 124 has adjacent each end an elongated horizontal slot 116 through which extends a pin 118 secured to the corresponding fork blade leg 90a or 92a. The fork blades 90, 92 and their connected legs are thus permitted individual limited sliding movement transversely or in a horizontal direction, but are restrained from movement vertically or longitudinally of the fork frame 85.

Transverse movement of the fork blades is controlled by a pair of hydraulic cylinders 126 controlled from the truck cab. Each cylinder 126 has piston rods 128 and 130 projecting from each end thereof and connected to the respective legs 92a and 90a of the fork blades 92 and 90. The cylinders 126 are selectively actuated simultaneously by conventional hydraulic means (not shown) to advance or retract the piston rods 128 and 130 and thereby slide the fork blades 90 and 92 toward and away from each other.

Each of the pallets 122 include the usual support bars 122a and 122b (FIG. 7) which rest upon the ground surface and support the pallet platform spaced thereabove. When the pallet and its supported load is to be picked up by the fork truck, the blades 90, 92 are drawn together laterally through cylinders 126 until they are spaced apart a distance substantially less than the distance between the pallet bars 122a and 122b. The blades are then inserted beneath the pallet so that they extend between the pallet bars and are parallel thereto. After insertion, the cylinders 126 are actuated to spread the blades apart. If the blades 90, 92 are inserted off center between the pallet bars 122a, 122b, that is to say with the center line therebetween out of registry with the center line between the pallet bars, spreading of the blades will cause one blade to contact the adjacent pallet bar before the other blade has contacted the opposite bar. As the blades continue to move apart, the first blade will push against its contacting pallet bar, shifting the pallet along the ground surface until the other blade comes into contact with the opposite bar. The pallet 122 will now be centered upon the two fork blades 90 and 92, and further spreading movement of the latter is halted. The pallet may now be lifted by the blades and will be precisely centered and balanced thereon. Suitable signal means may be provided to indicate to the operator in the truck cab the moment at which both blades engage the respective pallet bars.

By way of illustrative example, the hold area 16 of barge 10 is shown divided into three adjacent compartments, FIG. 2 shows in detail the manner in which the central hold compartment is divided into the load storage cells or bays 30 by the framework structure, it being understood that the particular arrangement is optional and is selected to meet the requirements both of the particular vessel and the load to be transported. In the situation shown in the drawings, the individual loads 120 are of rectangular shape in plan view, and the pallets are sized accordingly. The cells or bays 30 are sized to receive these loads snugly in the manner illustrated, and are shown arranged in transverse groups of three cells at either side of a central longitudinally extending passageway 132. As previously indicated, the stiffener plates of partitions 34 connect the angle irons 32 only in transverse directions and not longitudinally, so that transverse aisles 134, 136, 138, and 140 are provided through the various cells to permit movement of the fork lift assembly in depositing and removing loads.

Except for the single arm elements at the sides of the hold compartment, the angle irons forming the individual cells 30 project perpendicularly from both sides of the stiffener plates 34 to form the corners of cells 30 and with the arms thereof overlapping the corners of the load contained in the cell to restrain movement thereof, thereby eliminating the necessity of shoring operations. The central longitudinal passageway 132 has a greater width than any of the cells 30 the width of said passageway 132 being somewhat larger than the major axis of a load 120. To the ends of the metallic plates 34 are affixed irregularly shaped angle irons 142 each having a pair of spaced arms projecting into the central passageway 132 and dividing the latter into cells 144 which extend perpendicularly to the cell 30.

In the loading operation, palletized loads are stowed in the cells 30 starting adjacent to the skin of the hold and working toward the center. In practice, the operator will alternate the loads successively at the side of the barge in order to maintain the latter at an even keel. As the loading progresses, the palletized cargo is stacked vertically within the various cells, as shown in FIG. 3.

A typical unloading sequence of operation is shown in FIG. 3. In this view the progress of a load 120b, shown originally contained in one of the hold cells 30a, is illustrated. The fork truck 44 is brought into a position in which its fork blades register with the next adjacent cell 30b, and the blades are lowered therein until they are closely adjacent the bottom surface, in the position shown in phantom at 92a. The truck is then driven forward until the blades are located beneath the pallet supporting load 120b, and the pallet and load is lifted through the cell 30a until it is located above the wheels of the truck, as indicated by the arrows in FIG. 3. This elevated position of the load is shown at 120b'.

The fork truck cab 82 is now rotated 180° and driven along the gantry in the direction of the dock 60. The load is shown in phantom at 120b'' in FIG. 3, in the course of being transported toward the dock. When the truck reaches the end of the gantry extension 56, the load is supported above the surface of the dock as illustrated in phantom at 120b'''. The fork blades are now lowered until the pallet rests upon the dock, supporting the load illustrated in full line at 120b''''. The truck is now driven rearwardly until the fork blades move from beneath the pallet and are clear thereof as illustrated at 92b, and the blades are elevated to the level of the cab. The process is now repeated to unload additional cells.

It will be observed that in loading and unloading the palletized cargo, the cell adjacent to the load to be handled must be vacant in order to permit the fork blades to be inserted beneath or withdrawn from the pallets. As the cells 30 are filled with cargo, the center passageway 132 provides access for movement of the blades into the cells at either sides thereof. Finally, when all of the cells 30 are filled, cargo may be loaded into the cells 144 formed in the passageway 132 as indicated for example by the load 120a in FIG. 2. In performing such loading, the fork blades are turned 90° so that they are directed longitudinally of the ship, as shown in phantom in FIG. 2, and the movement thereof into and out of engagement with the loads is effected by driving the gantry rather than the truck. It will be appreciated that in the full loaded condition of the barge, all of the central passageway cells 144 are filled with stacked palletized loads except for the central cell in said passageway which provides the final access area for the blades.

An important feature of the invention resides in a signalling system which advises the operator when the truck and blades are in proper position relative to the loads. The signalling system includes sets of cams 150 projecting from the upper surfaces of the gantry rail 46 adjacent the track 62 thereon. FIGS. 4 and 5 show these cam sets 150 in detail, each set consisting of two elongated cam members 152 and 154, and a short central cam member 156. The cam members are parallel to each other and are transversely spaced as shown. The cam 152 terminates at a point in alignment with the forward end of central cam 156, while the latter terminates at a point in alignment with the forward end of cam 154. Each set 150 of three cams is located on the gantry in alignment with a respective longitudinal row of cells 30, and a set is mounted in alignment with the central passageway 132.

The fork truck chassis 70 is provided with an extension arm 158 projecting laterally from the center thereof and upon which are slidably mounted a set of three depending plungers 160, 162 and 164, as shown in FIG. 5. These plungers are spaced from each other in such a manner that the plunger 160 is positioned to contact cams 154 of the row of cam sets 150, while plunger 162 is positioned to contact cams 156 and plunger 164 is positioned to contact cams 152.

The plungers 160, 162 and 164 are associated with respective switches (not shown) within the extension arm 158. These switches are electrically connected to corresponding electric signal lights on a control panel within the fork truck cab. The plungers are normally biased downwardly to an inoperative position in which the aforementioned switches are open and the corresponding signal light deenergized. When the fork truck is driven along the gantry, engagement of each plunger with a corresponding cam member 152, 154 or 156 will elevate the plunger to actuate its coupled switch and thereby energize its corresponding signal light.

Similar sets of cams 166 are positioned along the barge deck 24 as shown in FIG. 2, with each set centered upon one of the transverse rows of cells 30. These cam sets 166 are identical in size and arrangement to the cam sets 150 previously described, and are therefore not shown or described in detail. In the same manner as the fork truck, the gantry has a centered extension arm carrying a set of plungers (not shown) positioned to contact the respective cam members of the cam sets 166, thereby actuating corresponding switches for energizing selected signal lights.

FIG. 6 shows a fork position indicator in the nature of a light panel 170 which is mounted in the operator's console within the truck cab. The panel 170 is shown as having five signal lamps arranged in a vertical and a horizontal row. The vertical row consists of lamps C, A and T, while the horizontal row consists of lamps B, A and D, the lamp A serving as the center lamp of each row. The panel 170 provides visual indication to the operator of the position of the fork blades relative to a selected cell in both transverse and longitudinal directions and also provides a signal to indicate when the fork blades register exactly with the center line of the cell. Thus, by observing the lamps on panel 170, the operator may drive both the fork truck and gantry and locate them at the precise positions in which the fork blades are centered on a particular cell, such that the blades may be lowered within the cell with adequate clearance.

The plungers 160, 162 and 164 of the cam sets 150, as well as the plungers of the cam sets 166 are electrically connected through their associated switches to lamps of the panel 170 so as to illuminate the appropriate lamps individually when the plungers are depressed by engaging the respective cams. With the fork truck 44 in the position shown in the drawings, for example, that is with the fork truck cab 82 rotated to face left as viewed in FIG. 3, the plunger 160 is electrically connected to lamp T, plunger 162 is connected to lamp A, and plunger 164 is connected to lamp C. Assuming that the truck has obtained a palletized load from the dock, and is to deposit this load into a cell 30 located in the first longitudinal row at the side of the barge adjacent the dock, the truck, still facing the dock or to the left as viewed in FIGS. 2 and 3 is run rearwardly from the edge of the gantry toward the selected cell. The plunger 164 first engages the cam member 152 of the cam set 150 aligned with the cell, and energizes the lamp C. The operator observes this signal and is immediately informed that the truck is approaching an aligned position above the selected cell, but has not reached that position. The truck is continued to be driven until the plunger 164 leaves the cam member 152 and the plunger 162 engages the central cam member 156, at which time the lamp C is extinguished and the central lamp A illuminated. The operator now knows that the truck is in proper aligned position with the cell, its fork blades being centered over the longitudinal center line of the cell. If the truck is not stopped on time, the plunger 162 will move out of contact with the cam member 156 and the third plunger 160 will move into contact with cam member 154 so that lamp A is extinguished and lamp C energized. The operator is thus advised that he has overdriven the cell, and must reverse the direction of the truck, stopping it at a point where only the lamp A is energized to indicate a dead center position of the fork blades.

After the load is lowered and deposited in the selected cell, the fork blades must be moved clear of the pallet and brought to a centered position within the next adjacent cell so that they can be elevated to above deck level. For this purpose, the operator drives the truck away from the load until the cam set 150 of the next adjacent cell is reached, and the truck stopped at a position in which this cam set illuminates the panel light A. The operator is now advised that the fork blades are centered in the next adjacent cell and can be safely elevated.

The plungers are connected to the lamps on panel 170 through sliding brush contacts in the truck turntable 80 in such a manner that the lamps are always energized to indicate the relative position of the fork blades, forwardly and rearwardly or to the left or right of the selected cell from the position in which the operator is facing. Thus, if the truck cab is rotated 180° to face away from the dock, as indicated in phantom at the right-hand side of FIG. 3, the connections between the plungers and the lamps are reversed and the plunger 160 is now connected to lamp C while plunger 164 is connected to lamp T. Thus, with the truck cab facing and driven to the right, the lamp T will first be illuminated to indicate that the fork blades are to the rear of the cell center line, and the lamp C will thereafter be illuminated to indicate that the truck has been driven too far and the fork blades are forward of the cell center line. Where the truck cab is turned 90° so that it faces fore or aft in the barge, for loading or unloading the cells 144 of the central passageway 132, the row of lamps C, A and T become connected to the plungers on the gantry and the row of lamps B, A and D become connected to the plungers 160, 162 and 164 on the truck cab so that the lamp C still indicates a position forwardly of a selected cell from the direction in which the operator and cab is facing, and the lamp T indicates a position to the rear of the cell. Such signalling system provides an easily remembered operation and avoids confusion to the operator.

The plungers carried by the gantry and associated with the cam sets 166 on the barge deck are similarly electrically connected to the lamps B, A and D on the panel 170 when the truck is facing transversely of the barge, as is normal. Through a similar system of brush contacts, the lamp B always indicates when the fork blades are to the left of the center line of a selected cell from the direction in which the operator is facing, while the lamp D indicates that the fork blades are to the right of the center line, and the lamp A indicates that the center line of the blades is in exact registry with the center line of the selected cell. In this condition, the lamps B, A and D therefore guide the operator in driving the gantry fore and aft, and enable him to position the gantry accurately so that the fork blades are in alignment with a selected transverse row of cells.

In actual operation, the operator would first drive the gantry to a position in which the fork blades register with the transverse row containing the selected cell, using the lamps B, A and D for this purpose. He would then drive the fork truck along the gantry until the blades register with the center line of the selected cell in that row, using the lamps C, A and T for that purpose. While the center lamp A is energized and remains illuminated when the proper gantry position is achieved, the operator may then employ only the lamps C and T to drive the fork truck to the selected cell, the proper position of the fork truck being attained when both lamps C and T are extinguished and only lamp A is illuminated. The lamps on panel 170 may be of varied coloration to aid in the visual determination of the blade positions, the center lamp A being preferably green to indicate the on centerposition of the fork blades.

A separate system of cams and panel light signals is employed for the loading and unloading operation at the edge of the barge. Thus, a cam member 172 is mounted on the surface of each of the gantry extensions 56 and a cam member 174 is similarly mounted on the gantry rail 46 at each end of gantry 42. The cam members 172 and 174 are mounted on the upper surfaces of lateral extensions of the gantry in such a manner that the cam members 172 and 174 are laterally offset from each other and are offset outwardly of the sets of cams 150.

The truck chassis extension arm 158 also mounts a pair of depending plungers 180 and 182 similar to the plungers 160, 162, and 164. These plungers 180 and 182 are located outwardly of the plunger 160 and are spaced from each other and positioned to contact the cam 172 and cam 174 respectively. The plungers 180 and 182 are associated with respective switches (not shown) within the extension arm 158, which switches are electrically connected to corresponding electric signal lights on a control panel 178 (FIG. 6) within the fork truck cab. The plungers 180 and 182 are normally biased downwardly to an inoperative position in which the aforementioned switches are open and the corresponding signal light deenergized. When the fork truck is driven toward either end of the gantry, engagement of either plunger 180 or 182 with its corresponding cam member 172 or 174 will elevate the plunger to actuate its coupled switch and thereby energize its corresponding signal light.

The control panel 178 in the operator's cab has mounted thereon five electric signal lamps designated as U1, U2, L1, L2, and H. Manually-operated switch means, indicated at 184 in FIG. 6, is provided in the operator's cab, whereby the cam members 172 and 174 are alternately connected either to lamps U1 and U2 or to lamps L2 and L1. That is to say, in one position of the switch 184, the cam member 172 is connected to the lamp U1 and the cam member 174 is connected to lamp U2 for an unloading operation. In the other position of the switch 184, the cam member 172 is connected to lamp L2 and the cam member 174 is connected to lamp L1 for a loading operation.

On the under surface of the fork blade 90 is the depending arm 179 of a heel switch. When the fork frame 85 is lowered until the arm 179 engages the surface of the dock the arm 179 is moved by such engagement to actuate the heel switch which is electrically connected to the lamp H on the panel 178. The lamp H is thereby energized, informing the operator that the fork assembly has reached the surface, and the fork blades are properly positioned above the surface to engage or release the palletized load. The operator then halts the downward movement of the fork frame. The lamp H is also used in lowering the fork blades into the hull of the barge, illumination of lamp H indicating that the fork assembly has contacted the bottom surface of the hull.

An example of the operation of the aforementioned signal system may be seen with reference to FIG. 3, wherein there is shown fork truck 44 facing to the left and carrying load 120b″ toward the left-hand side of the barge 10 for the purpose of unloading the palletized cargo on the dock. In this condition, the operator would throw the switch 184 to the unload position so that the cam members 172, 174 are connected respectively to lamps U1 and U2 on the control panel 178.

The lamp U1 indicates to the operator that the first unloading position has been reached and the lamp U2 indicates that the second unloading position has been reached. As the fork truck 44 approaches the end of the gantry 42, the cam member 174 is first engaged by the plunger 182, illuminating lamp U2, but the operator continues to drive the truck to the left along the gantry until the lamp U1 is illuminated. As the truck continues to move, the lamp U2 is extinguished and the cam member 172 is next engaged by plunger 180, illuminating lamp U1, so that the operator immediately halts the fork truck at this first unloading position. The cam member 172 is positioned to be engaged by plunger 180 when the fork truck 44 is at the extreme end of the gantry 42 so that the fork blades 90 and 92 are clear of the side of the barge and are located above the surface of the dock 60. The cargo is then lowered to the surface of the dock as shown at 120b‴ in FIG. 3, the heel switch arm 179 engaging the dock surface and illuminating lamp H on panel 178 to indicate that the fork blades are ready to be withdrawn from beneath the pallet 122. The operator then drives the fork truck in the opposite direction, or toward the right as viewed in FIG. 3 until the plunger 182 engages and is depressed by the cam member 174 to illuminate the lamp U2 and indicate that the second unloading position has been reached. The cam member 174 is so positioned that this second unloading signal is given when the fork blades are in the position shown at 92b in FIG. 3, that is, clear of the load 120b'''' and also clear of the side of the barge. The operator stops the truck as soon as the U2 lamp signal is given, and raises the fork blades to the level of the truck.

The reverse procedure is utilized when cargo is to be lifted from the dock and loaded into the barge. The operator throws switch 184 to the load position, connecting the plungers 180 and 182 respectively to the L2 and L1 lamps. As the fork truck is driven on the gantry toward the dock, the plunger 174 is first engaged by plunger 182, illuminating lamp L1 and indicating to the operator that the first loading position is reached. The operator then stops the truck and lowers the fork blades until the signal lamp H indicates that the blades are close to the surface of the dock in the position shown at 92b in FIG. 3, immediately behind the palletized load. The truck is then driven further forwardly until plunger 180 engages cam 172 to indicate that the second loading position has been reached, with the fork blades located beneath the pallet supporting the load. The blades are centered on the load, and the load lifted to the level of the barge deck for stowing into a selected cell.

It will be appreciated that where loads are to be stacked one upon another upon the dock or within the hold, the switch arm 179 will engage the top surface of the uppermost load in the stack to indicate through lamp H that the fork blades have engaged the same.

While a preferred embodiment of the invention has been shown and described herein, it is obvious that numerous omissions, changes and additions may be made in such embodiment without departing from the spirit and scope of the invention.

I claim:

1. Apparatus for the loading and unloading of palletized cargo within a floating vessel having a deck and an open hold below said deck for storing said cargo, said apparatus comprising a gantry structure movably mounted on said deck and bridging and overlying said hold, a fork truck mounted on said gantry structure for movement in a longitudinal direction thereupon in a direction normal to the direction of movement of said gantry, an elongated fork frame movably mounted on said fork truck, a pair of fork blades mounted at the lower end of said fork frame, and means for moving said fork frame on said fork truck in a vertical direction, said fork frame being of sufficient length to carry the fork blades mounted thereon between a lowered position in which the fork blades and the lower end of said frame are located below the level of the fork truck and at the level of the bottom of the hold of said vessel, and a raised position in which the fork blades and the lower end of said elongated fork frame are located above the bottom of said fork truck, and above the level of said vessel deck and the gantry structure thereon.

2. Apparatus according to claim 1 in which said gantry structure is mounted for movement longitudinally of said vessel and said fork truck is mounted on said gantry structure for movement in a direction transverse of said vessel.

3. Apparatus according to claim 1 in which said fork blades are movably mounted on said fork frame for transverse movement thereon, said fork frame having hydraulically-operated means mounted thereon for selectively moving said fork blades toward and away from each other in equal increments relative to the center line of said fork frame whereby the fork blades in closely-spaced position may be inserted beneath said palletized cargo and spread apart to center said palletized cargo on said fork blades.

4. Apparatus according to claim 1 in which said gantry has extensions at each end projecting beyond the side of said vessel to form continuations of said gantry for supporting said fork truck in a position in which the fork blades can be lowered along the sides of said vessel below the deck level thereof, and in which said elongated fork frame is pivotally mounted on said truck and means are provided to turn said fork frame on said truck to a horizontally-disposed stowing position.

5. Apparatus according to claim 1 in which the hold of said vessel is divided into a plurality of cells arranged in longitudinal and transverse rows, and said apparatus also includes automatic signal means between said deck and said gantry and between said gantry and said fork truck for indicating the position of said gantry and fork truck relative to each of said cells.

6. Apparatus according to claim 5 in which automatic signal means includes a plurality of first cam units located along the deck of said vessel in alignment with each transverse row of said cells, first switch means carried by gantry and successively engageable with each of said first cam units, as said gantry moves along said vessel as the fork blades of the fork truck carried by said gantry come into registry with the central axis of the transverse row of cells associated with said engaged cam unit, and indicator means located within said fork truck and operatively connected to said first switch means for providing a signal when said first switch means engages each first cam unit.

7. Apparatus according to claim 6 in which said automatic signal means also includes a plurality of second cam units, located along said gantry in alignment with each longitudinal row of said cells, second switch means carried by said fork truck and successively engageable with each of said second switch units as the fork truck moves along said gantry as the fork blades of the fork truck come into registry with the central axis of the longitudinal row of cells associated with said engaged second cam unit, said second switch means being operatively connected to said indicator means for providing a signal within said fork truck when the second switch means engages each second cam unit.

8. Apparatus according to claim 7 in which each of said first and second cam units includes a set of three cams longitudinally and transversely spaced from each other, and in which each of said switch means includes a set of three spaced plunger members arranged for individual engagement with the respective cams of the corresponding set, each of said cam sets including a pair of elongated cams extending longitudinally in opposite directions from a relatively short central cam, said central cam being located to be engaged by the corresponding plunger member when the fork blades register with the central axis of the corresponding cell, said pair of elongated cams being located to be respectively engaged by the corresponding plunger members when the fork blades are off-center of the central axis of said cell in either direction, said indicator means including a plurality of signal lamps, and switch means electrically connecting each of said plunger members to a respective signal lamp.

9. Apparatus according to claim 4 in which said gantry has a first cam member mounted thereon adjacent the end of each of said extensions and a second cam member located inwardly of said first cam member, said fork truck carrying a first cam-engaging member positioned to engage said first cam member when the fork truck is moved to a first position at the end of said gantry, and a second cam-engaging member positioned to engage the second cam member when the fork truck is located on said gantry in a second position spaced inwardly from said first position by at least the length of said fork blades, and signal means operatively connected to each of said cam-engaging members for indicating when the fork truck is located at each of said positions relative to said gantry.

10. Apparatus according to claim 9 in which said signal means includes a first pair of signal lamps comprising a first unloading position lamp and a second unloading position lamp, and a second pair of signal lamps comprising a first loading position lamp and a second loading position lamp, and switch means for alternately and selectively electrically connecting said first and second sets to said cams engaging members in an unloading switch setting in which said first unloading position lamp is connected to said first cam-engaging member and the second unloading position lamp is connected to said second cam-engaging member, and a loading switch setting in which said second loading position lamp is connected to said first cam-engaging member and said first loading position lamp is connected to said second cam-engaging member.

11. Apparatus according to claim 4 in which said fork frame carries a heel switch at the lower end thereof positioned to engage and be depressed by a surface when said fork frame is lowered toward said surface and said fork blades are spaced slightly thereabove, and signal means operatively connected to said heel switch for indicating the slightly spaced position of said fork blades above said surface.

References Cited

UNITED STATES PATENTS

| | | | |
|---|---|---|---|
| 710,920 | 10/1902 | Morgan | 212—132 X |
| 2,553,378 | 5/1951 | Miller. | |
| 2,748,966 | 6/1956 | Gohrke | 214—731 |
| 2,761,571 | 9/1956 | Adams | 214—15 |
| 2,980,264 | 4/1961 | Burt et al. | 212—132 |
| 3,034,675 | 5/1962 | Quayle | 214—730 |
| 3,042,227 | 7/1962 | Tatlinger | 214—15 |

ROBERT G. SHERIDAN, *Primary Examiner.*